United States Patent
Fischer et al.

(10) Patent No.: US 12,421,923 B2
(45) Date of Patent: Sep. 23, 2025

(54) INTERNAL COMBUSTION ENGINE FOR GASEOUS FUELS

(71) Applicant: Robert Bosch GmbH, Stuttgart (DE)

(72) Inventors: Fabian Fischer, Waiblingen (DE); Marco Beier, Rudolstadt (DE); Oezguer Tuerker, Gerlingen (DE); Stefan Stein, Stuttgart (DE); Torsten Burock, Vaihingen An der Enz (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/715,310

(22) PCT Filed: Nov. 28, 2022

(86) PCT No.: PCT/EP2022/083412
§ 371 (c)(1),
(2) Date: May 31, 2024

(87) PCT Pub. No.: WO2023/099376
PCT Pub. Date: Jun. 8, 2023

(65) Prior Publication Data
US 2025/0027462 A1    Jan. 23, 2025

(30) Foreign Application Priority Data
Dec. 1, 2021  (DE) .................. 10 2021 213 604.4

(51) Int. Cl.
*F02M 21/02*    (2006.01)
(52) U.S. Cl.
CPC .... *F02M 21/0242* (2013.01); *F02M 21/0206* (2013.01); *F02M 21/0293* (2013.01)

(58) Field of Classification Search
CPC .......... F02M 21/0242; F02M 21/0206; F02M 21/0293
(Continued)

(56) References Cited

U.S. PATENT DOCUMENTS

2009/0150050 A1* 6/2009 Mashida ............... F02D 19/061
                                                                251/12
2011/0265464 A1   11/2011 Kojima et al.

FOREIGN PATENT DOCUMENTS

DE    102018215847 A1    3/2020
DE    102019201905 A1    8/2020
(Continued)

OTHER PUBLICATIONS

JP-09317513-A (Sato et al.) (Dec. 9, 1997) (Machine Translation) (Year: 1997).*
(Continued)

*Primary Examiner* — Logan M Kraft
(74) *Attorney, Agent, or Firm* — Michael Best & Friedrich LLP

(57) ABSTRACT

Internal combustion engine for gaseous fuels having a combustion chamber (2) in which gaseous fuel is burned. The gaseous fuel is kept at an operating pressure in a gas tank (7) and fed to the combustion chamber (2) via a supply line (6). The combustion chamber (2) is connected to a fresh air line (10) through which ambient air is fed to the combustion chamber (2). The exhaust gas from the combustion chamber (2) is fed to an exhaust gas catalytic converter (14) via an exhaust pipe (13). A pressure relief line (16, 16') with a switchable release valve (17, 17) branches off from the supply line (6), via which gaseous fuel can be discharged from the supply line (6).

20 Claims, 3 Drawing Sheets

(58) Field of Classification Search
USPC .......................................................... 123/527
See application file for complete search history.

(56) References Cited

FOREIGN PATENT DOCUMENTS

DE       102020214697 A1    5/2022
JP          09317513 A  *  12/1997  .............. F02B 43/00

OTHER PUBLICATIONS

Translation of International Search Report for Application No. PCT/EP2022/083412 dated Feb. 17, 2023 (2 pages).

\* cited by examiner

INTERNAL COMBUSTION ENGINE FOR GASEOUS FUELS

BACKGROUND

The invention relates to an internal combustion engine for gaseous fuels, wherein the internal combustion engine is set up in particular for the combustion of hydrogen.

Internal combustion engines for the combustion of gaseous fuel, in particular also for the combustion of hydrogen, are known from the prior art. DE 10 2020 214 697 A1, for example, shows an internal combustion engine in which the gaseous fuel—for example hydrogen—is stored in high-pressure tanks. The highly pressurized hydrogen is fed to the internal combustion engine via a supply line and burned in the combustion chambers, wherein mechanical energy is obtained from the combustion energy. The exhaust gases are discharged to the outside via an exhaust gas catalytic converter, where nitrogen oxides in particular, but also unburned hydrogen, are broken down. The hydrogen can be introduced directly into the combustion chamber of the internal combustion engine, wherein it is mixed with the fresh air supplied in the combustion chamber, or the hydrogen is already mixed with the air in a supply line and the hydrogen-air mixture is then fed into the combustion chamber.

In the supply line through which the hydrogen or gaseous fuel is fed to the combustion chamber, the gaseous fuel is under an injection pressure, even when the internal combustion engine is switched off. However, a great deal of technical effort is required to keep the supply line permanently sealed and thus prevent gaseous fuel from escaping even when the internal combustion engine is not running for a long time. In particular, the complete sealing of hydrogen is technically difficult to realize and these sealing measures would make the production of such an internal combustion engine considerably more expensive. The effort can be reduced by relieving the supply line after shutdown, but for environmental and safety reasons the fuel in it cannot simply be released into the environment.

SUMMARY

In contrast, the internal combustion engine for gaseous fuels according to the invention has the advantage that the internal combustion engine is permanently sealed even after shutdown with a reasonable sealing effort and no gaseous fuel escapes to the outside. For this purpose, the internal combustion engine for gaseous fuels has a combustion chamber in which gaseous fuel is burned to generate mechanical energy. There is also a gas tank in which gaseous fuel is kept under an operating pressure and fed to the combustion chamber via a supply line. Downstream of the combustion chamber there is an exhaust gas catalytic converter to which the exhaust gas is fed from the combustion chamber via an exhaust pipe. Ambient air is supplied to the combustion chamber via a fresh air line. A pressure relief line with a switchable drain valve branches off from the supply line, via which the gaseous fuel can be discharged from the supply line.

After the internal combustion engine is switched off, the gaseous fuel is present in the supply line under the injection pressure. To reduce the requirement for sealing in the supply line, the gaseous fuel is discharged via the pressure relief line, thus reducing the pressure. A switchable release valve is arranged in the pressure relief line in order to close the pressure relief line when the internal combustion engine is running. If the supply line is at ambient pressure or at a pressure that does not deviate significantly from the ambient pressure, the supply line can be sealed relatively easily and with reasonable technical effort so that no gaseous fuel escapes to the outside even if the internal combustion engine is not running for a long time.

In a first advantageous embodiment, a non-return valve is arranged in the pressure relief line, which blocks a backflow of gas through the pressure relief line into the supply line. This prevents a malfunction caused by backflowing gas entering the supply line via the pressure relief line.

In a further advantageous embodiment, a controllable tank valve is arranged between the gas tank and the supply line, with which the supply line can be disconnected from the gas tank. If the pressure in the supply line is to be reduced, it is of course necessary to prevent further gaseous fuel from entering the supply line from the tank, which is the task of the controllable tank valve.

In a further advantageous embodiment, both the release valve and the tank valve can be switched electrically, wherein the tank valve is closed when de-energized and the release valve is open when de-energized. If there is a sudden interruption in the power supply to the release valve and tank valve, it must be ensured that the gaseous fuel cannot continue to flow out of the tank and reach the outside via the pressure relief line. The normally closed tank valve prevents the fuel from flowing in, while the release valve is open in this case and ensures that the pressure of the gaseous fuel in the supply line is relieved and the internal combustion engine is brought to a controlled shutdown state. In an advantageous embodiment, the release valve and the tank valve are connected in such a way that the tank valve is always closed when the release valve is open.

In a further advantageous embodiment of the invention, the pressure relief line opens into the exhaust pipe downstream of the combustion chamber. There, the gaseous fuel from the supply line mixes with the exhaust gas from the combustion chamber and is fed to the catalytic converter. Especially when burning hydrogen, the exhaust gas still contains a high proportion of oxygen so that there is enough oxidizing agent to break down the hydrogen in the catalytic converter.

In a further advantageous embodiment, the pressure relief line opens into the fresh air line, via which the combustion chamber is supplied with ambient air for combustion. When the internal combustion engine is switched off, the crankshaft continues to rotate a few revolutions and thus moves the pistons. If the ignition is maintained for these remaining revolutions, the gaseous fuel is burned and the supply line is relieved. The gaseous fuel is advantageously introduced into the fresh air line via an injection valve to ensure that the gaseous fuel is well mixed with the fresh air, resulting in effective combustion.

In another advantageous embodiment, a further pressure relief line with a switchable release valve branches off from the supply line, wherein one pressure relief line opens into the fresh air line and the other pressure relief line opens into the exhaust pipe. This combination of the two pressure relief lines mentioned above combines the advantages of both solutions, which is beneficial in special operating situations. If, for example, the internal combustion engine is switched off again shortly after starting, gaseous fuel is already present in the supply line under operating pressure, but the catalytic converter has not yet reached the necessary operating temperature and cannot oxidize the gaseous fuel. In this case, feeding the gaseous fuel into the fresh air line is advantageous, as combustion in the combustion chamber is already ensured. The advantage of supplying the gaseous fuel upstream of the catalytic converter, on the other hand, is that in the event of a sudden power interruption to all valves and thus also to the ignition devices in the combustion chamber, the gaseous fuel can easily be discharged via the de-energized open release valve. Due to the revving engine, there is enough air for combustion or oxidation of the gaseous fuel in the catalytic converter.

BRIEF DESCRIPTION OF THE DRAWINGS

The drawing shows various exemplary embodiments of the internal combustion engine according to the invention. The following is shown in the figures.

DETAILED DESCRIPTION

Figure 1:
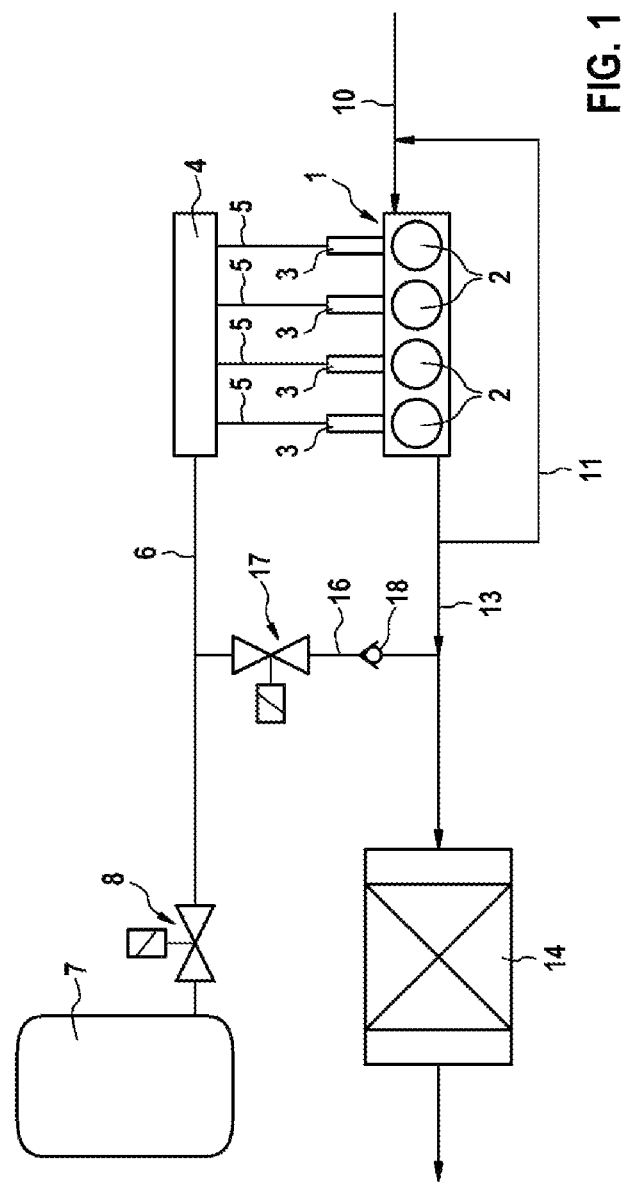
FIG. 1 is a schematic representation of a first exemplary embodiment of the internal combustion engine according to the invention.

FIG. 1 shows a schematic representation of an internal combustion engine according to the invention. In the context of the present invention, the internal combustion engine includes not only the actual engine block with the combustion chambers and the corresponding pistons, but also the add-on components for supplying the internal combustion engine with gaseous fuel and the exhaust gas aftertreatment. The internal combustion engine comprises an engine block 1 in which several combustion chambers 2 are formed. The fuel, in this case a gaseous fuel, is fed directly into the respective combustion chambers 2 via injectors 3. The gaseous fuel is made available in a gas rail 4, from where the fuel is fed to the individual injectors 3 via pressure lines 5. The gaseous fuel is made available in a gas tank 7, which is connected to the gas rail 4 via a supply line 6. A tank valve 8 is arranged between the gas tank 7 and the supply line 6, which can be switched electrically and which can separate the gas tank 7 from the supply line 6. If the pressure in the gas tank 7 is higher than required for injecting the fuel through the injectors 3, a pressure reducer can be arranged in the supply line 6 or between the gas tank 7 and the tank valve 8, which reduces the pressure level of the gas tank 7 to the required pressure.

To feed ambient air into the combustion chambers 2, a fresh air line 10 is connected to the combustion chambers 2 via inlet valves not shown. The exhaust gas produced in the combustion chambers 2 is discharged via an exhaust pipe 13. For combustion optimization, exhaust gas recirculation is provided via a recirculation line 11, through which part of the exhaust gas from the exhaust line 13 can be fed back into the combustion chambers 2. The exhaust gas line 3 opens into an exhaust gas catalytic converter 14, in which undesirable components of the exhaust gas, in particular unburned gaseous fuel and nitrogen oxides, are broken down. The remaining exhaust gas is released from the catalytic converter into the ambient air.

To reduce residual pressure in the supply line 6, there is a pressure relief line 16 that connects the supply line 6 to the exhaust pipe 13. A release valve 17, which can also be switched electrically, is arranged in the pressure relief line 16. In addition, a non-return valve 18 is arranged in the pressure relief line 16, which only allows gas to flow in the direction of the exhaust pipe 13 and prevents gaseous fuel or exhaust gas from flowing back.

When the internal combustion engine is switched off, gaseous fuel is present in the supply line 6 under the gas pressure provided in the gas rail 4. If the internal combustion engine is at rest for a longer period, the supply line 6 must be kept gas-tight for the entire time, which is technically complex. To reduce the amount of sealing required, the pressure in the supply line is lowered to the ambient pressure. To do this, the tank valve 8 is closed and the release valve 17 is opened so that the gaseous fuel flows out of the supply line 6 into the exhaust line 13. There, the fuel is mixed with the exhaust gas, which still contains a relatively large amount of oxygen, especially when burning hydrogen, so that there is enough oxidizing agent to break down the gaseous fuel in the catalytic converter.

The wiring of the tank valve 8 and the release valve 17 is as follows: The tank valve 8 is normally closed, i.e., if the power supply to the tank valve 8 is interrupted, it is automatically closed, for example by a spring mechanism, so that the tank 7 is sealed against the supply line 6. The release valve 17, on the other hand, is open when de-energized, i.e., it is opened automatically when the power supply is interrupted in order to drain the gaseous fuel from the supply line 6 into the exhaust pipe 13. To prevent an uncontrolled outflow of gaseous fuel, it must always be ensured that the tank valve 8 and the release valve 17 are not open at the same time. The release valve 17 or the pressure relief line 16 can also be used to relieve not only the supply line 6 but also the gas rail 4. However, it is also possible that a further shut-off valve is provided between the supply line 6 and the gas rail 4, so that only the supply line 6 is relieved via the pressure relief line 16.

Figure 2:
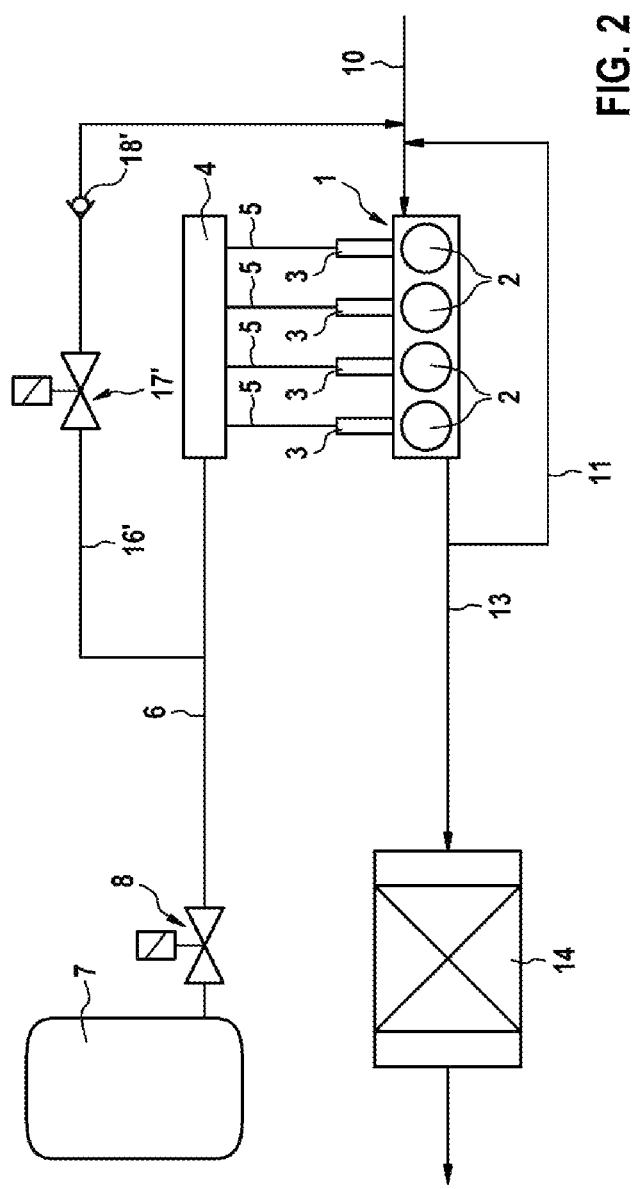
FIG. 2 is a second exemplary embodiment and FIG. 3 is a third exemplary embodiment, in each case in the same representation as FIG. 1.

FIG. 2 shows a further exemplary embodiment in the same illustration as FIG. 1. Here, the pressure relief line 16 is not provided between the supply line 6 and the exhaust pipe 13, but the pressure relief line 16' opens into the fresh air line 10. As in the exemplary embodiment shown in FIG. 1, a release valve 17' and a non-return valve 18' are also provided in the pressure relief line 16'. The gaseous fuel from the supply line 6 and is fed to the fresh air, where it is mixed with the fresh air and fed to the internal combustion engine. After the internal combustion engine is switched off, it continues to run for a few more revolutions with the ignition still active, so that the fuel is burned as in normal operation. This process is particularly effective with hydrogen, as it can be ignited in a wide mixing ratio with air.

Figure 3:
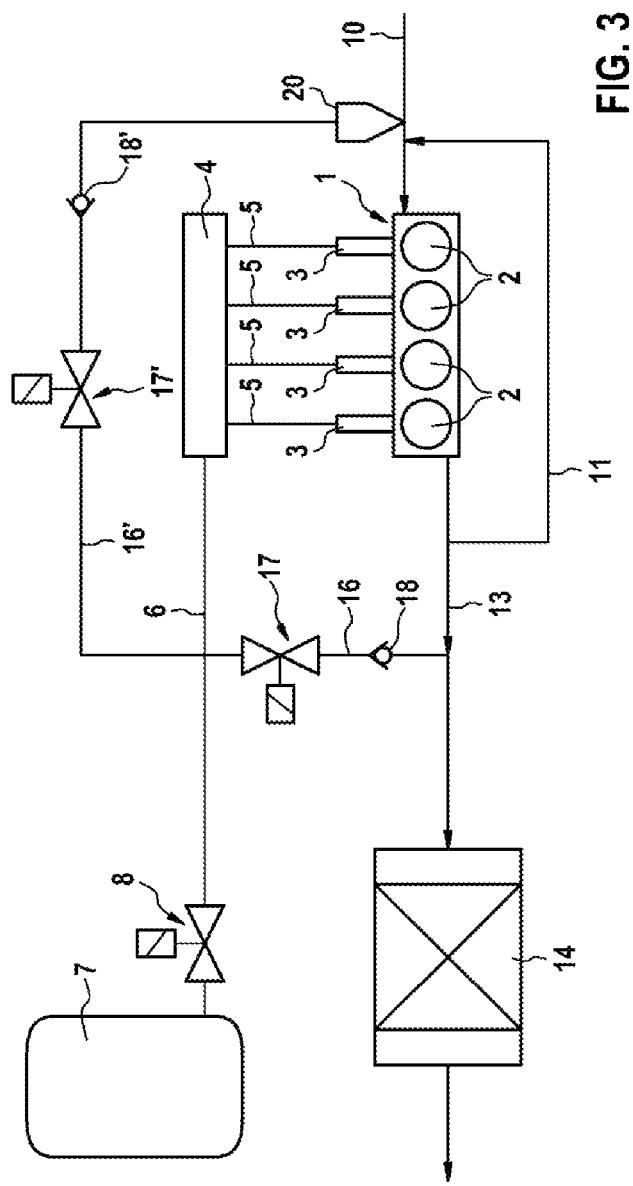

FIG. 3 shows a further exemplary embodiment of the internal combustion engine according to the invention. This solution is a combination of the design examples in FIGS. 1 and 2. Two pressure relief lines 16, 16' are provided here, wherein one pressure relief line 16 runs between the supply line 6 and the exhaust pipe 13, while the other pressure relief line 16' connects the supply line 6 to the fresh air line 10. These two pressure relief lines 16, 16' make it easier to intercept certain operating states. If, for example, the internal combustion engine is switched off again shortly after starting, the gaseous fuel in the catalytic converter cannot be burned or oxidized because it has not yet reached its operating temperature. In this case, a reduction via the supply into the fresh air line is more effective, as the combustion in the internal combustion engine functions without further ado due to its residual rotations. If, on the other hand, the entire power supply to the internal combustion engine is suddenly interrupted due to a malfunction, and thus of course also the ignition of the internal combustion engine, the gaseous fuel can still be broken down via the catalytic converter, as enough exhaust gas still flows into the catalytic converter via the revving internal combustion engine and thus enough oxidizing agent is present to break down the gaseous fuel there.

In the exemplary embodiment of FIG. 3, the gaseous fuel is advantageously fed into the fresh air line 10 not via a simple connection of the pressure relief line 16' to the fresh air line 10, but via an injection valve 20. Targeted flow routing and the appropriately designed injection valve 20 ensure good mixing of the gaseous fuel with the air in the fresh air line 10.

If the exhaust gas catalytic converter 14 is not readily suitable for reducing the gaseous fuel, for example hydrogen, because the catalytic converter is optimized for reducing the nitrogen oxides, it may also be possible to connect the pressure relief line 16 to a separate catalytic converter which is optimized only for reducing the gaseous fuel and—in contrast to the exemplary embodiment of FIG. 1 or 3—is supplied with fresh air.

What is claimed is:

1. An internal combustion engine for gaseous fuels having a combustion chamber (2) in which gaseous fuel is burned, in which the gaseous fuel is kept at an operating pressure in a gas tank (7) and fed to the combustion chamber (2) via a supply line (6), and having an exhaust gas catalytic converter (14) which is connected to the combustion chamber (2) via an exhaust pipe (13), and having a fresh air line (10) via which ambient air is supplied to the combustion chamber (2), wherein
   a pressure relief line (16; 16') with a switchable release valve (17; 17') branches off from the supply line 6, via which the gaseous fuel can be discharged from the supply line (6);
   wherein the pressure relief line (16; 16') opens into the exhaust pipe (13) upstream of the exhaust gas catalytic converter (14).

2. The internal combustion engine according to claim 1, wherein a non-return valve (18; 18') is arranged in the pressure relief line (16; 16'), which blocks a backflow of gas through the pressure relief line (16; 16') into the supply line (6).

3. The internal combustion engine according to claim 1, wherein a controllable tank valve (8) is arranged between the gas tank (7) and the supply line (6), with which the supply line (6) can be disconnected from the gas tank (7).

4. The internal combustion engine according to claim 3, wherein the release valve (17; 17') and the tank valve (8) are electrically switchable, wherein the tank valve (8) is closed when de-energized and the release valve (17; 17') is open when de-energized.

5. The internal combustion engine according to claim 4, wherein the release valve (17; 17') and the tank valve (8) are connected in such a way that the tank valve (8) is closed when the release valve (17; 17') is open.

6. The internal combustion engine according to claim 1, wherein the pressure relief line (16; 16') opens into the fresh air line (10).

7. The internal combustion engine according to claim 6, wherein the pressure relief line (16') is connected to an injection valve (20) which introduces the gas into the fresh air line (10).

8. The internal combustion engine according to claim 1, wherein a further pressure relief line (16') with a switchable release valve (17) branches off from the supply line (6), wherein one pressure relief line (16') opens into the fresh air line (10) and the other pressure relief line (16) opens into the exhaust pipe (13).

9. The internal combustion engine according to claim 1, wherein the internal combustion engine is set up for the combustion of hydrogen.

10. An internal combustion engine for gaseous fuels having a combustion chamber (2) in which gaseous fuel is burned, in which the gaseous fuel is kept at an operating pressure in a gas tank (7) and fed to the combustion chamber (2) via a supply line (6), and having an exhaust gas catalytic converter (14) which is connected to the combustion chamber (2) via an exhaust pipe (13), and having a fresh air line (10) via which ambient air is supplied to the combustion chamber (2);
   wherein a first pressure relief line (16) with a first switchable release valve (17) branches off from the supply line 6, via which the gaseous fuel can be discharged from the supply line (6);
   wherein a second pressure relief line (16') with a second switchable release valve (17') branches off from the supply line (6);
   wherein the second pressure relief line (16') opens into the fresh air line (10) and the first pressure relief line (16) opens into the exhaust pipe (13).

11. The internal combustion engine according to claim 10, wherein a first non-return valve (18) is arranged in the first pressure relief line (16).

12. The internal combustion engine according to claim 10, wherein a second pressure relief valve (18') is arranged in the second pressure relief line (16').

13. The internal combustion engine according to claim 10, wherein a first non-return valve (18) is arranged in the first pressure relief line (16), and a second pressure relief valve (18') is arranged in the second pressure relief line (16').

14. The internal combustion engine according to claim 10, wherein a controllable tank valve (8) is arranged between the gas tank (7) and the supply line (6), with which the supply line (6) can be disconnected from the gas tank (7).

15. The internal combustion engine according to claim 14, wherein the first release valve (17) and the tank valve (8) are electrically switchable, wherein the tank valve (8) is closed when de-energized and wherein the first release valve (17) is open when de-energized.

16. The internal combustion engine according to claim 14, wherein the first release valve (17) and the tank valve (8) are connected in such a way that the tank valve (8) is closed when the first release valve (17) is open.

17. The internal combustion engine according to claim 10, wherein the second pressure relief line (16') opens into the fresh air line (10) upstream of the combustion chamber (2).

18. The internal combustion engine according to claim 17, wherein the second pressure relief line (16') is connected to an injection valve (20) which introduces the gas into the fresh air line (10).

19. The internal combustion engine according to claim 17, wherein the first pressure relief line (16) opens into the exhaust pipe (13) upstream of the exhaust gas catalytic converter (14).

20. The internal combustion engine according to claim 10, wherein the internal combustion engine is set up for the combustion of hydrogen.

* * * * *